(12) United States Patent
Muriel et al.

(10) Patent No.: US 12,115,904 B2
(45) Date of Patent: Oct. 15, 2024

(54) REDUNDANT SYSTEM FOR BRAKE LIGHT OPERATION

(71) Applicant: FORD GLOBAL TECHNOLOGIES, LLC, Dearborn, MI (US)

(72) Inventors: Roberto Villegas Muriel, Atizapan de Zaragoza (MX); Harold John Felch, Novi, MI (US); Luis Manuel Noriega, Distrito Federal (MX); Ricardo Gutierrez, Iztapalapa (MX)

(73) Assignee: Ford Global Techologies, LLC, Dearborn, MI (US)

( * ) Notice: Subject to any disclaimer, the term of this patent is extended or adjusted under 35 U.S.C. 154(b) by 61 days.

(21) Appl. No.: 18/109,004

(22) Filed: Feb. 13, 2023

(65) Prior Publication Data
US 2024/0270161 A1   Aug. 15, 2024

(51) Int. Cl.
*B60Q 1/44* (2006.01)
(52) U.S. Cl.
CPC ......... *B60Q 1/444* (2013.01); *B60W 2540/12* (2013.01)
(58) Field of Classification Search
CPC ...................... B60Q 1/444; B60W 2540/12
See application file for complete search history.

(56) References Cited

U.S. PATENT DOCUMENTS

| | | | |
|---|---|---|---|
| 6,411,204 B1 * | 6/2002 | Bloomfield | B60Q 1/535 340/471 |
| 6,554,373 B1 | 4/2003 | Bill | |
| 8,718,893 B1 | 5/2014 | Kim | |
| 9,758,139 B2 | 9/2017 | Ullrich et al. | |
| 10,336,247 B2 * | 7/2019 | Ault | B60Q 1/448 |
| 10,538,163 B2 | 1/2020 | Nam | |
| 11,292,446 B2 | 4/2022 | Grieser-Schmitz et al. | |
| 2003/0048182 A1 * | 3/2003 | Fulks | B60T 7/042 340/665 |
| 2007/0279207 A1 * | 12/2007 | Clark | B60Q 1/441 340/479 |
| 2008/0094200 A1 * | 4/2008 | Matsumoto | B60Q 1/444 340/469 |

(Continued)

FOREIGN PATENT DOCUMENTS

| | | |
|---|---|---|
| CN | 108791262 A | 11/2018 |
| CN | 210760456 U | 6/2020 |

(Continued)

*Primary Examiner* — Chico A Foxx
(74) *Attorney, Agent, or Firm* — Burr & Forman LLP; Lorne Forsythe

(57) ABSTRACT

A vehicle control system for controlling the activation of brake lights on a vehicle may include a pedal angle sensor operably coupled to a brake pedal of a vehicle to measure brake pedal angle, an electronic brake boost (EBB) system which may include an EBB module and a pedal travel sensor, a vehicle control module (VCM) which may monitor the EBB system and a brake light control module which may be operably coupled to the EBB module and the pedal angle sensor. The brake light control module may control the operation of brake lights on the vehicle based on input from the pedal travel sensor in a first state. The brake light control module may switch to a second state in which the operation of the brake lights may be controlled based on input from the pedal angle sensor responsive to the brake light control module detecting state change criteria.

20 Claims, 5 Drawing Sheets

(56) References Cited

U.S. PATENT DOCUMENTS

| | | | | |
|---|---|---|---|---|
| 2009/0160633 | A1* | 6/2009 | Clark | B60Q 1/441 |
| | | | | 340/479 |
| 2009/0179486 | A1* | 7/2009 | Ikeda | B60L 50/13 |
| | | | | 303/3 |
| 2011/0295468 | A1* | 12/2011 | Crombez | B60W 10/184 |
| | | | | 701/48 |
| 2015/0307104 | A1* | 10/2015 | Azzi | B60W 30/18127 |
| | | | | 701/33.4 |
| 2020/0055445 | A1* | 2/2020 | Park | B60Q 1/441 |
| 2023/0009011 | A1* | 1/2023 | Kim | B60T 1/10 |
| 2023/0192048 | A1* | 6/2023 | Moon | B60T 1/10 |
| | | | | 701/22 |

FOREIGN PATENT DOCUMENTS

| | | | |
|---|---|---|---|
| JP | 2000190776 | A | 7/2000 |
| JP | 2008055932 | A | 3/2008 |
| JP | 2014534113 | A | 12/2014 |
| KR | 0139953 | B1 | 6/1998 |
| KR | 20000073667 | | 12/2000 |
| KR | 20140023347 | A | 2/2014 |
| KR | 20200020027 | A | 2/2020 |
| KR | 102089656 | B1 | 3/2020 |
| WO | 2013060508 | A1 | 5/2013 |

* cited by examiner

REDUNDANT SYSTEM FOR BRAKE LIGHT OPERATION

TECHNICAL FIELD

Example embodiments generally relate to the operation of a vehicle's brake lights and, more particularly, relate to an alternative system for operating the vehicle's brake lights for safety purposes.

BACKGROUND

A common design for vehicle brakes for many years has been vacuum boosted brakes. These systems would boost the performance of the brakes by requiring less force to be applied to the brake pedal by the vehicle operator. In such cases, vehicles may include a switch mounted to the pedal that can signal to activate the brake lights responsive to the brake pedal being displaced by the operator. While newer vehicles continue to employ vacuum boosted brakes, some modern vehicles may employ different systems for creating the boost in performance, such as, but not limited to, electronic brake boost (EBB) systems and electromechanical brakes (EMB). In some cases, the EBB module of the vehicle may provide power for the vehicle's brake lights. Thus, in the event that the EBB module is not operational, an alternative system for operating the brake lights may be desirable.

BRIEF SUMMARY OF SOME EXAMPLES

In accordance with an example embodiment, a vehicle control system for controlling the activation of brake lights on a vehicle may therefore be provided. The vehicle control system may include a pedal angle sensor operably coupled to a brake pedal of a vehicle to measure brake pedal angle, an electronic brake boost (EBB) system which may include an EBB module and a pedal travel sensor, a vehicle control module (VCM) which may monitor the EBB system and a brake light control module which may be operably coupled to the EBB module and the pedal angle sensor. The brake light control module may control the operation of brake lights on the vehicle based on input from the pedal travel sensor in a first state. The brake light control module may switch to a second state in which the operation of the brake lights may be controlled based on input from the pedal angle sensor responsive to the brake light control module detecting state change criteria.

In another example embodiment, a brake light control module for controlling the operation of brake lights on a vehicle may therefore be provided. The brake light control module may be operably coupled to an electronic brake boost (EBB) system and a pedal angle sensor. The EBB system may include an EBB module and a pedal travel sensor. The pedal angle sensor is operably coupled to a brake pedal of the vehicle to measure angular displacement of the brake pedal. The brake light control module may control the operation of brake lights on the vehicle based on input from the pedal travel sensor in a first state. The brake light control module may switch to a second state in which the operation of the brake lights may be controlled based on input from the pedal angle sensor responsive to the brake light control module detecting state change criteria.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
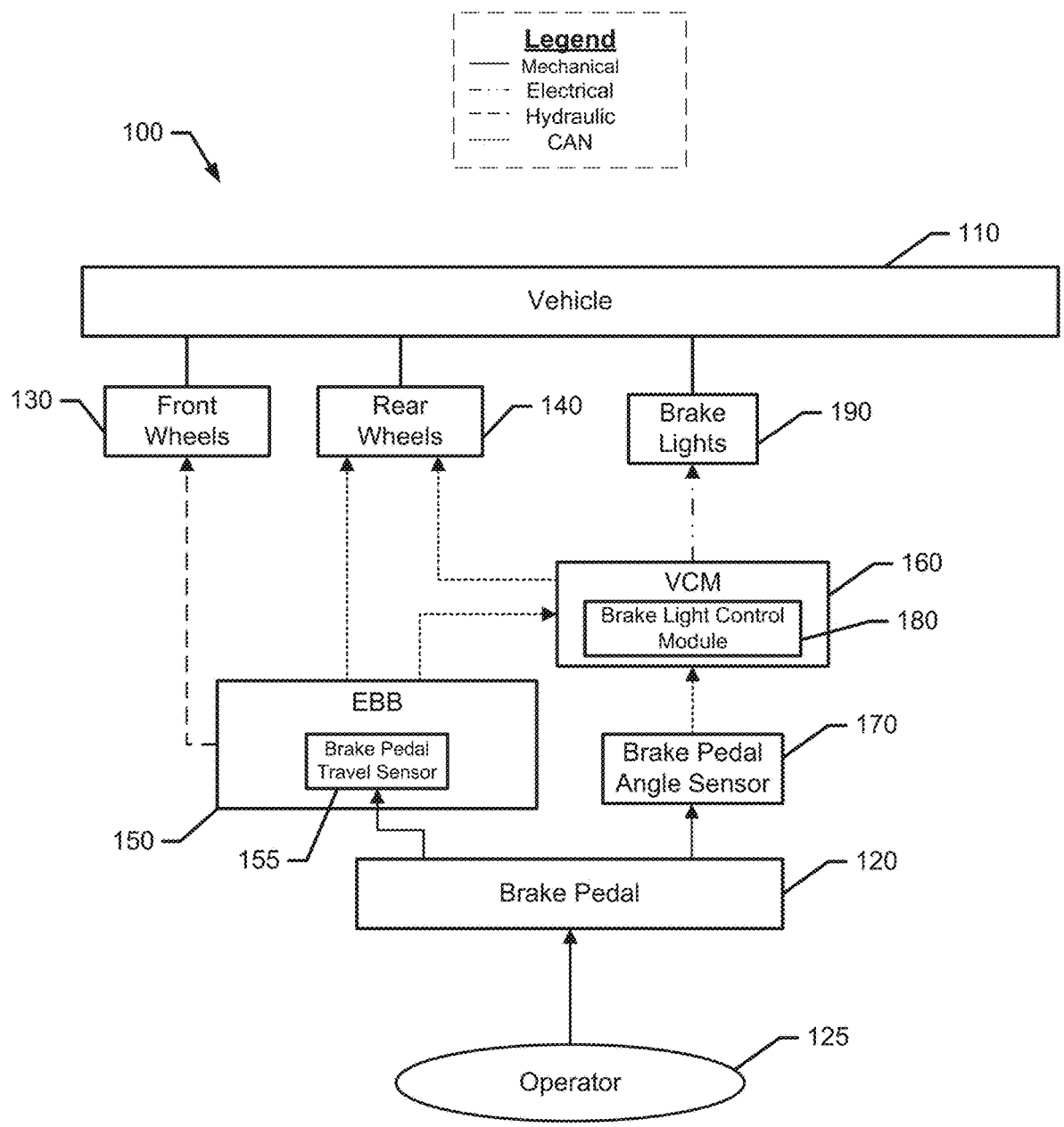
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. Vehicles with an EBB system may rely on a pedal travel sensor contained within the EBB to activate the brake lights responsive to the brake pedal being displaced by the operator, while vehicles with an EMB system may rely on a pedal angle sensor to activate the brake lights. In some cases, a vehicle may employ a split brake system where the EBB system may operate the front brakes, and the EMB system may operate the rear brakes. In this regard, for example, some embodiments may provide a brake light control module that may integrate easily into existing components in the vehicle and may provide a redundant alternative method of control for the activation of the brake lights. For instance, in such cases where the vehicle braking may be accomplished by different systems, the brake light control module may utilize different input signals for the appropriate activation of the brake lights depending on the particular system used to brake the vehicle.

FIG. 1 illustrates a block diagram of a vehicle control system 100 according to an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110 and to each other, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In the embodiment depicted in FIG. 1, such control pedals may include a brake pedal 120. However, the control pedals could alternatively be hand operated or any other operable member via which an operator 125 may provide an input indicative of an intent of the operator 125 relative to controlling braking of the vehicle 110. As described above, the vehicle 110 may include different systems that may be individually or collectively responsible for braking the vehicle 110, including but not limited to brakes boosted by an electronic brake boost (EBB) system and electromechanical brakes (EMB). Also mentioned above, in some cases, the vehicle 110 may employ a split brake system. In this regard, the EBB system may operate brakes that may be disposed at the front wheels 130 of the vehicle 110, and the EMB system may operate brakes that may be disposed at the rear wheels 140 of the vehicle 110.

Accordingly, the EBB system may include an EBB module 150 operably coupled the brake pedal 120 to boost the brakes disposed at the front wheels 130. In other words, the EBB module 150 may amplify the force applied to the brake pedal 120 by the operator 125 into an appropriate braking force that may be applied to the brakes disposed at the front wheels 130 of the vehicle 110 in order to effectively slow down the vehicle 110 in a controlled manner. For example, the operator 125 may first apply a force to the brake pedal 120. The displacement of the brake pedal 120, which may be operably coupled to the EBB module 150 in some embodiments, may signal to the EBB module 150 to increase the hydraulic force applied to the actual brakes at the front wheels 130 of the vehicle 110 via the brake assembly. In order to do so, the EBB module 150 may contain a pump within the EBB module 150 so that the EBB module 150 can increase the hydraulic force on the brake assembly to be to be adequate for stopping the vehicle 110 based on the input at the brake pedal 120. The EBB module 150 may also include a brake pedal travel sensor 155 that may indicate the displacement of the brake pedal 120 responsive to the operator 125 applying input force to the brake pedal 120.

Additionally, the vehicle control system 100 may further include a vehicle control module (VCM) 160. While the VCM 160 may have many functions, one such function of the VCM 160 may be monitoring the status of other components of the vehicle 110. The components that the VCM 160 may monitor the status of may be included in, or not included in, the vehicle control system 100. In this regard, the VCM 160 may be responsible for detecting and reading any diagnostic trouble codes (DTC's) or other faults associated with the components of the vehicle 110. In an example embodiment, the VCM 160 may receive information that is used to determine the status of various components or subassemblies of the vehicle 110 via various sensors that may be operably coupled to the components or subassemblies. Such sensors may be part of a sensor network and sensors of the sensor network may be operably coupled to the VCM 160 (and/or the components or subassemblies) via a vehicle communication bus (e.g., a controller area network (CAN) bus), indicated in FIG. 1 by the dotted line connectors as described in the legend. In some cases, the VCM 160 may communicate the status of certain components in the vehicle 110 to other components in the vehicle 110, so that appropriate action may be taken to ensure the vehicle 110 may continue operating without any components that may be experiencing a fault or a DTC.

Furthermore, the control system 100 may also include a brake pedal angle sensor 170. The brake pedal angle sensor 170 may be disposed at, and operably coupled to, the brake pedal 120, and may detect and measure the angle of the brake pedal 120 as an indication of the displacement of the brake pedal 120. In any case, the brake pedal angle sensor 170 may be separate from the brake pedal travel sensor 155 disposed within the EBB module 150. As described above, the brake pedal travel sensor 155 may indicate the displacement of the brake pedal 120 responsive to the operator 125 applying input force to the brake pedal 120, whereas the brake pedal angle sensor 170 may indicate the angle of the brake pedal 120 responsive to the operator 125 applying input force to the brake pedal 120. In other words, the brake pedal travel sensor 155 and the brake pedal angle sensor 170 may record different data from the same action, the action being the actuation of the brake pedal 120. According to some embodiments, the brake pedal angle sensor 170 may monitor the angle of the brake pedal 120 at all times, but the control system 100 may not actively use the input data from the brake pedal angle sensor 170 at all times. As described below, a brake light control module 180 may decide whether to use the signal from the brake pedal travel sensor 155 or from the brake pedal angle sensor 170.

Figure 2:
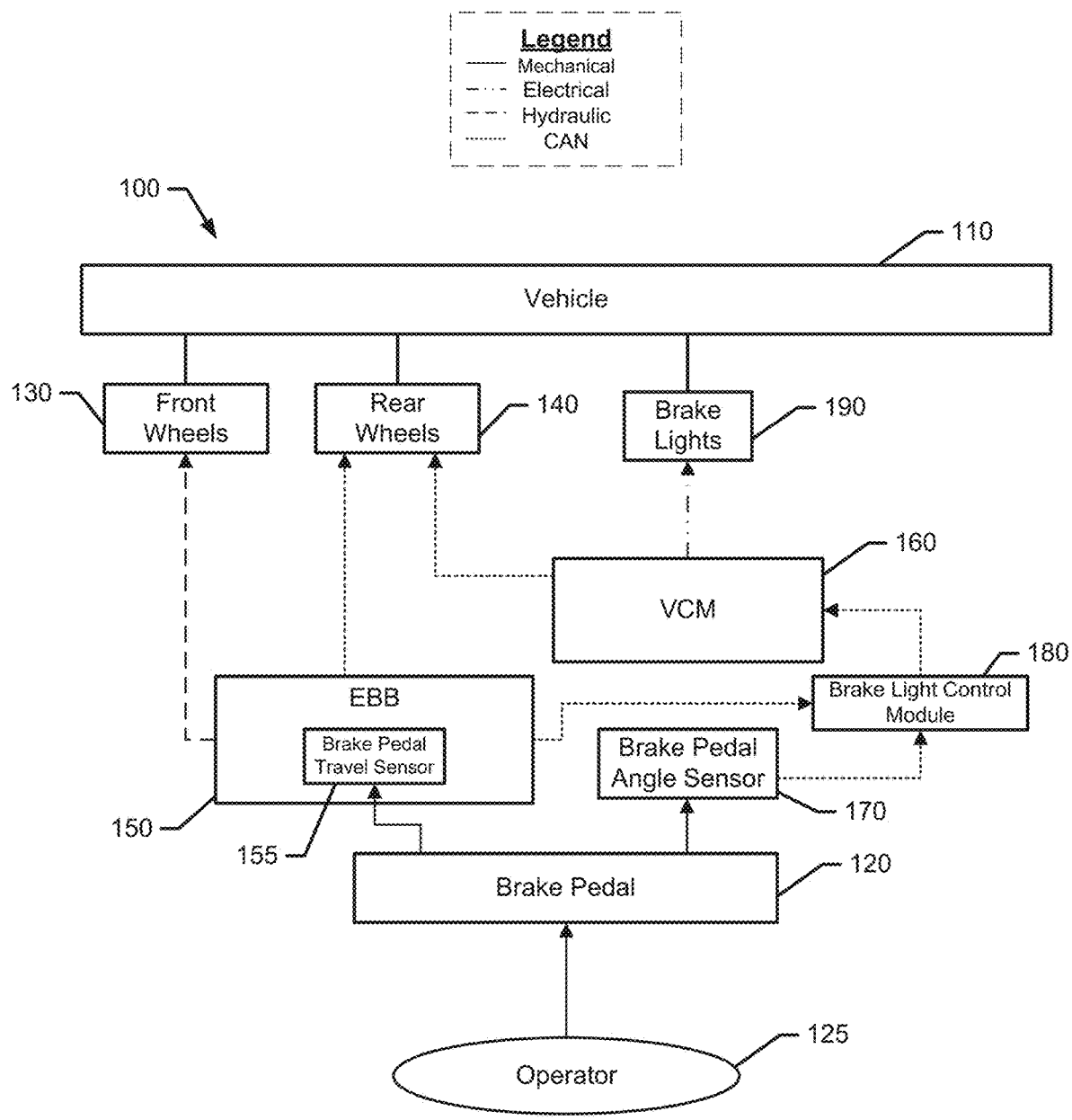
FIG. 2 illustrates a block diagram of a vehicle control system in accordance with an example embodiment.
Figure 3:
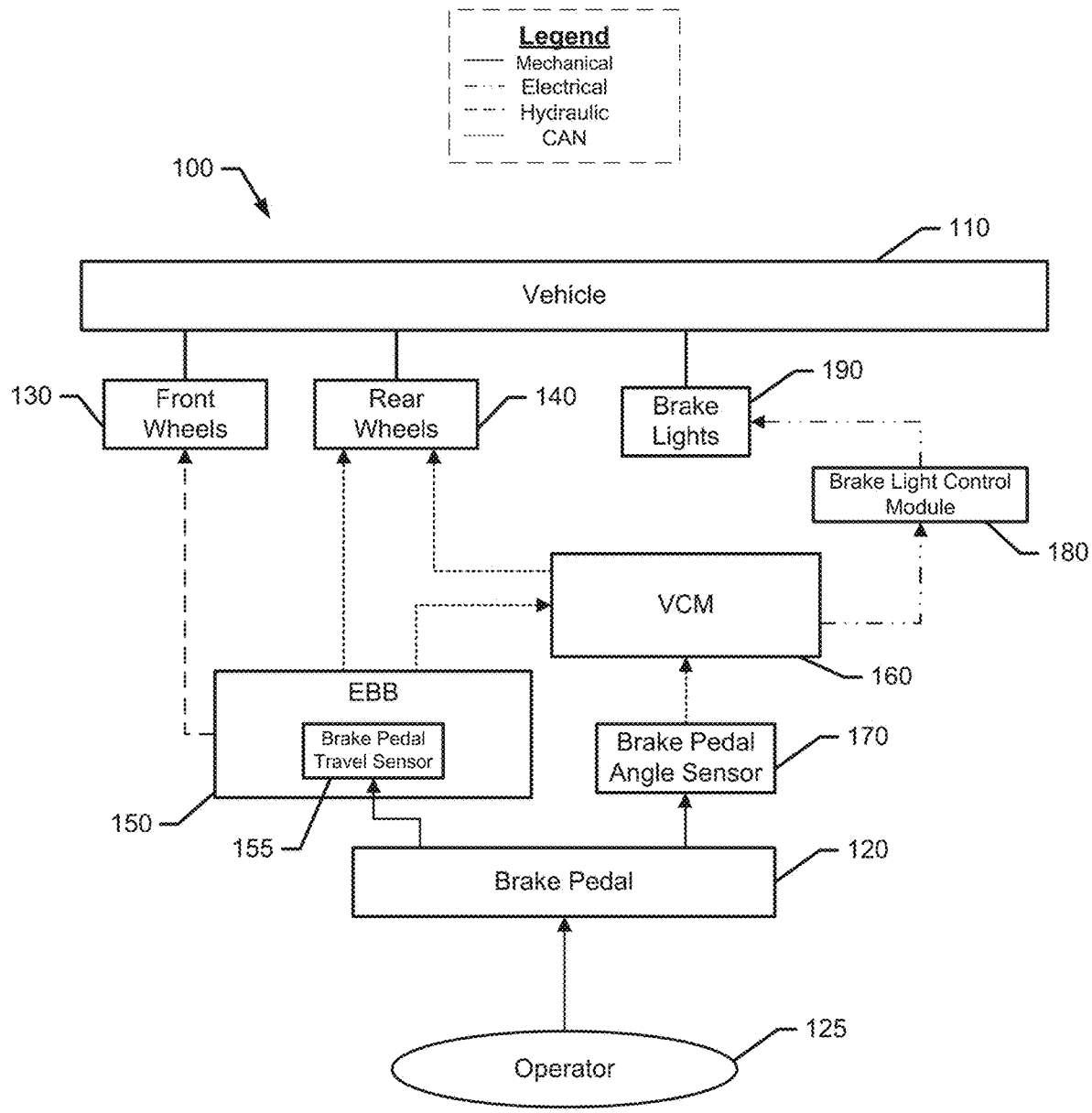
FIG. 3 illustrates a block diagram of a vehicle control system in accordance with an example embodiment.

Also shown in FIG. 1, in some cases, the control system 100 may also include the brake light control module 180. The brake light control module 180 may be operably coupled to the EBB module 150 and to the brake pedal angle sensor 170 to receive input data relating to the actuation of the brake pedal 120 from both the brake pedal travel sensor 155 and the brake pedal angle sensor 170. In the embodiment depicted in FIG. 1, the brake light control module 180 may be disposed within the VCM 160. However, FIGS. 2 and 3 depict embodiments where the brake light control module 180 may be disposed between the VCM 160 and the sensors (155, 170) or between the VCM 160 and the brake lights 190, respectively. In this regard, in the embodiment of FIG. 2, the inputs to the brake light control module 180 may come from the pedal angle sensor 170 and the EBB module 150. On the other hand, in FIG. 3, the input to the brake light control module 180 may come from the VCM 160.

The brake light control module 180 may control the operation of the brake lights 190 based on the input data provided to the brake light control module 180 by both the brake pedal angle sensor 170 and the brake pedal travel sensor 155, as will be described in greater detail in reference to later figures. Under normal circumstances, the brake light control module 180 may control the operation of the brake lights 190 based on input from the pedal travel sensor 155 in a first state. In this regard, under such normal circumstances, the EBB system may act as the primary braking system for the vehicle 110. As such, the brake pedal travel sensor 155 may act as the primary sensor to monitor displacement of the brake pedal 120. Thus, responsive to the brake pedal travel sensor 155 indicating that the brake pedal 120 has been displaced at least to a predetermined threshold value, the brake light control module 180 may activate the brake lights 190 appropriately. Similarly, responsive to the brake pedal travel sensor 155 indicating that the brake pedal 120 has been released and is no longer displaced at least to a predetermined threshold value, the brake light control module 180 may deactivate the brake lights 190. Therefore, under normal circumstances, and in the first state of the brake light control module 180, the EBB system may be fully operational and the EBB module 150 may provide the input to the brake light control module 180.

Under alternative circumstances however, the brake light control module 180 may switch to a second state in which control of the brake lights may change to being based on the brake pedal angle sensor 170. In other words, the EBB system may function as the primary source for braking the vehicle 110. However, in the event that the EBB system experiences an error or fault, the vehicle 110 may rely on the EMB system operably coupled to the rear wheels 140 to brake the vehicle 110. In such cases, the VCM 160 may detect a status signal associated with the EBB module 150, and the brake light control module 180 may switch from the first state to the second state, such that control of the brake lights 190 may be based on input from the pedal angle sensor 170 responsive to the VCM 160 communicating state change criteria to the brake light control module 180 based on the status signal indicating a fault with the EBB module 150. In an example embodiment, the status signal may be off during normal operation of the EBB system and may turn on to indicate the EBB system having a fault. In some other cases, the status signal may be on during normal operation of the EBB system and may turn off to indicate the EBB system having a fault.

Figure 4:
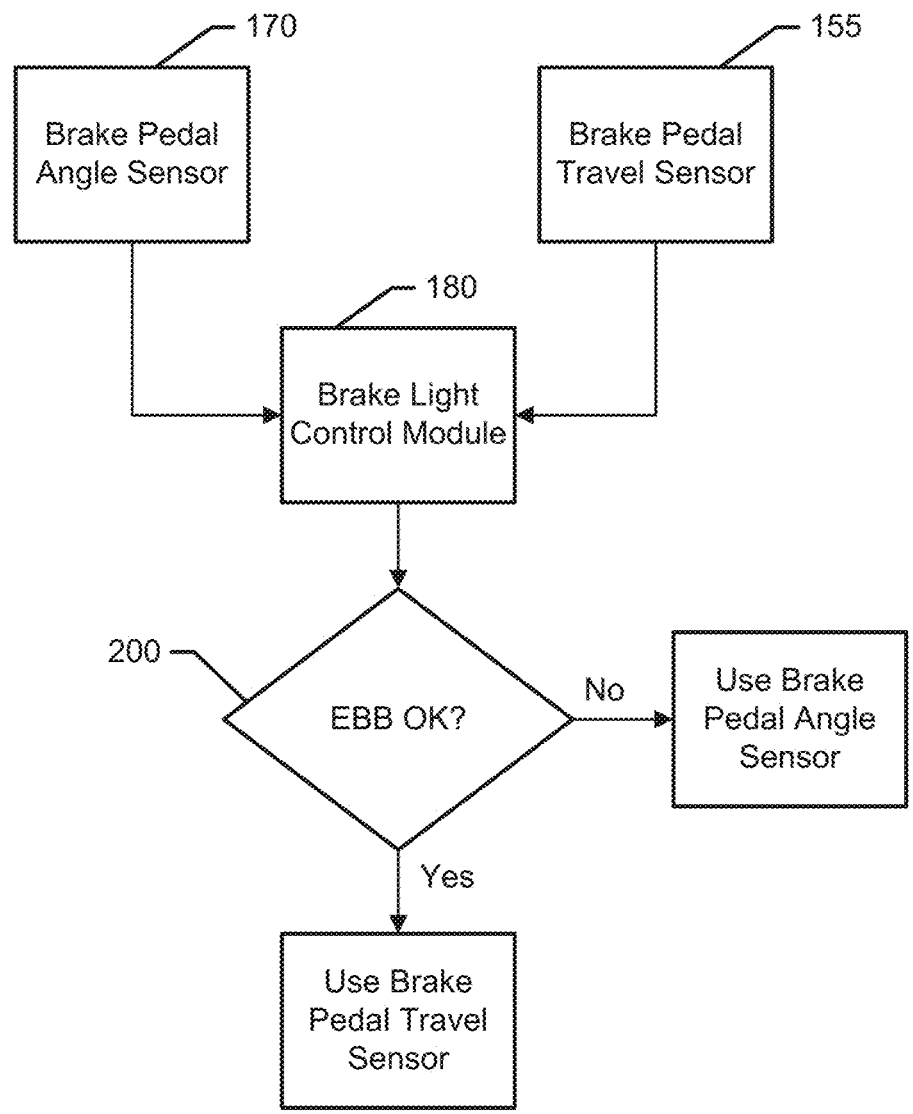
FIG. 4 illustrates a flow chart of a decision making process of the brake light control module in accordance with an example embodiment.

As depicted in FIG. 4, the brake light control module 180 may, under normal operating circumstances, receive input signals from the brake pedal travel sensor 155. However, in the case where the status signal from the EBB module 150 indicates a DTC or a fault of some nature, the input signal from the brake pedal travel sensor 155 may not be transmitted to the brake light control module 180. Thus, the VCM 160 may detect the DTC as the status signal associated with the EBB module 150. The brake light control module 180 may include processing circuitry that may communicate with the VCM 160 to receive state change criteria from the VCM 160 based on the status signal from the EBB module 150, and as a result, the brake light control module 180 may switch control of the operation of the brake lights 190 to be based on input from the pedal angle sensor 170. In this regard, FIG. 4 depicts the decision making process of the brake light control module 180. The brake light control module 180, at decision 200, evaluates whether or not the EBB system is properly functional based on communication with the VCM 160 about any DTC's or faults with the EBB module 150 that may be indicated by the status signal associated with the EBB module 150. In the example embodiment of FIG. 4, if the EBB module 150 is properly functional, the brake light control module 180 may not receive the state change criteria from the VCM 160 and may continue to control the activation of the brake lights 190 based on input from the pedal travel sensor 155. In the alternative, if the status signal from the EBB module 150 indicates a DTC or a fault of some kind, then the brake light control module 180 may receive state change criteria from the VCM 160 and may switch control of the brake lights 190 to being based on input from the pedal angle sensor 170 since the vehicle 110 may be braking using the EMB system as opposed to the EBB system.

Figure 5:
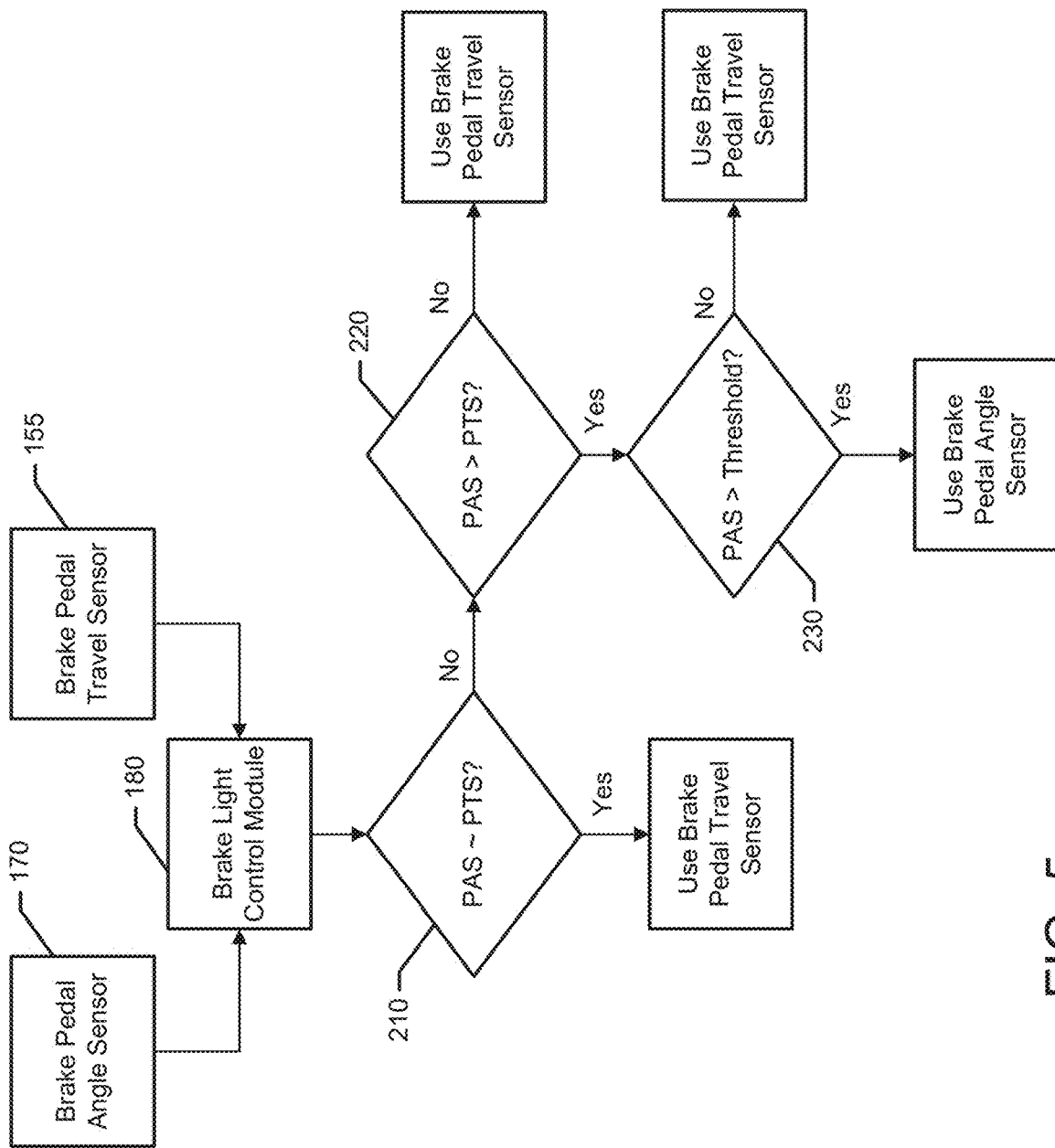
FIG. 5 illustrates a flow chart of a decision making process of the brake light control module in accordance with an example embodiment.

FIG. 5 illustrates another decision making process of the brake light control module 180, in accordance with an example embodiment. In the embodiment of FIG. 5, the brake light control module 180 may continually compare the input from the pedal angle sensor 170 to the input from the pedal travel sensor 155. In this regard, the brake light control module 180 may determine, at decision 210, if the input from the pedal angle sensor 170 indicates that the brake pedal 120 may be displaced greater than, substantially similar to, or less than the indication from the input from the pedal travel sensor 155. In the case where the pedal angle sensor 170 may indicate a substantially similar displacement of the brake pedal 120 as the input from the pedal travel sensor 155 does, the brake light control module 180 may not detect any state change criteria, and may continue to control the brake lights 190 based on input from the pedal travel sensor 155. In the alternative, responsive to the input from the pedal angle sensor 170 not being substantially similar to the input from the pedal travel sensor 155, the brake light control module 180 may decide, at decision 220, if the input from the pedal angle sensor 170 indicates greater displacement of the brake pedal 120 than the input from the pedal travel sensor 155. Responsive to the brake light control module 180 determining that the input from the pedal angle sensor 170 does not indicate a greater displacement of the brake pedal 120 than the input from the pedal travel sensor 155, the brake light control module 180 may not detect any state change criteria and may continue to control the brake lights 190 based on input from the pedal travel sensor 155.

Responsive to the brake light control module 180 determining that the input from the pedal angle sensor 170 does indicate a greater displacement of the brake pedal 120 than the input from the pedal travel sensor 155, the brake light control module 180 may then determine, at decision 230, if the input from the pedal angle sensor 170 indicates a displacement of the brake pedal 120 that exceeds a predetermined threshold value for displacement of the brake pedal 120. Accordingly, responsive to the input from the pedal angle sensor 170 indicating a displacement of the brake pedal 120 that may exceed the predetermined threshold value, the brake light control module 180 may detect state change criteria and may switch control of the brake lights 190 to being based on input from the pedal angle sensor 170. On the contrary, responsive to the input from the pedal angle sensor 170 indicating a displacement of the brake pedal 120 that may not exceed the predetermined threshold value, the brake light control module 180 may not detect state change criteria and may continue to control the brake lights 190 based on input from the pedal travel sensor 155.

A vehicle control system for controlling the activation of brake lights on a vehicle may therefore be provided. The vehicle control system may include a pedal angle sensor operably coupled to a brake pedal of a vehicle to measure brake pedal angle, an electronic brake boost (EBB) system which may include an EBB module and a pedal travel sensor, a vehicle control module (VCM) which may monitor the EBB system and a brake light control module which may be operably coupled to the EBB module and the pedal angle sensor. The brake light control module may control the operation of brake lights on the vehicle based on input from the pedal travel sensor in a first state. The brake light control module may switch to a second state in which the operation of the brake lights may be controlled based on input from the pedal angle sensor responsive to the brake light control module detecting state change criteria.

The vehicle control system of some embodiments may include additional features, modifications, augmentations and/or the like to achieve further objectives or enhance performance of the vehicle control system. The additional features, modifications, augmentations and/or the like may be added in any combination with each other. Below is a list of various additional features, modifications, and augmentations that can each be added individually or in any combination with each other. For example, the vehicle control module may detect a status signal associated with the EBB module. In an example embodiment, the VCM may communicate state change criteria to the brake light control module responsive to detecting the status signal. In some cases, the brake light control module may switch control of the brake lights to being based on input from the pedal angle sensor responsive to the brake light control module receiving the state change criteria. In an example embodiment, the status signal may be off during normal operation of the EBB system and may turn on to indicate the EBB system having a fault. In some cases, the status signal may be on during normal operation of the EBB system and may turn off to indicate the EBB system having a fault. In an example embodiment, the brake light control module may continually compare the input from the pedal angle sensor to the input from the pedal travel sensor. In some cases, the brake light control module may determine if the input from the pedal angle sensor indicates that the brake pedal may be displaced greater than, substantially similar to, or less than the indication from the input from the pedal travel sensor. In an example embodiment, responsive to the input from the pedal angle sensor indicating a substantially similar displacement of the brake pedal as the input from the pedal travel sensor, the brake light control module may continue to control the brake lights based on input from the pedal travel sensor. In some cases, responsive to the input from the pedal angle sensor indicating a greater displacement of the brake pedal than the input from the pedal travel sensor, the brake light control module may then determine if the input from the pedal angle sensor indicates a displacement of the brake pedal that exceeds a predetermined threshold value. In an example embodiment, the brake light control module may detect state change criteria responsive to the input from the pedal angle sensor indicating a displacement of the brake pedal that exceeds the predetermined threshold value, and the brake light control module may switch control of the brake lights to being based on input from the pedal angle sensor responsive to detecting state change criteria. In some cases, responsive to the input from the pedal angle sensor indicating a displacement of the brake pedal that does not exceed the predetermined threshold value, the brake light control module may continue to control the brake lights based on input from the pedal travel sensor. In an example embodiment, the brake light control module may be disposed within the vehicle control module. In some cases, the brake light control module may be disposed between the pedal angle sensor and the vehicle control module such that the inputs to the brake light control module may come from the pedal angle sensor and the EBB module. In an example embodiment, the brake light control module may be disposed between the vehicle control module and the brake lights such that the input to the brake light control module may come from the vehicle control module.

A brake light control module for controlling the operation of brake lights on a vehicle may therefore be provided. The brake light control module may be operably coupled to an electronic brake boost (EBB) system and a pedal angle sensor. The EBB system may include an EBB module and a pedal travel sensor. The pedal angle sensor is operably coupled to a brake pedal of the vehicle to measure angular displacement of the brake pedal. The brake light control module may control the operation of brake lights on the vehicle based on input from the pedal travel sensor in a first state. The brake light control module may switch to a second state in which the operation of the brake lights may be controlled based on input from the pedal angle sensor responsive to the brake light control module detecting state change criteria.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system comprising:
a pedal angle sensor operably coupled to a brake pedal of a vehicle to measure brake pedal angle;
an electronic brake boost (EBB) system comprising an EBB module and a pedal travel sensor;
a vehicle control module (VCM) configured to monitor the EBB system; and
a brake light control module operably coupled to the EBB module and the pedal angle sensor,
wherein the brake light control module controls operation of brake lights on the vehicle based on input from the pedal travel sensor in a first state, and
wherein the brake light control module switches to a second state in which the operation of the brake lights is controlled based on input from the pedal angle sensor responsive to the brake light control module detecting state change criteria.

2. The vehicle control system of claim 1, wherein the brake light control module continually compares the input from the pedal angle sensor to the input from the pedal travel sensor.

3. The vehicle control system of claim 2, wherein responsive to the input from the pedal angle sensor indicating a substantially similar displacement of the brake pedal as the input from the pedal travel sensor, the brake light control module continues to control the brake lights based on input from the pedal travel sensor.

4. The vehicle control system of claim 2, wherein responsive to the input from the pedal angle sensor indicating a greater displacement of the brake pedal than the input from the pedal travel sensor, the brake light control module then determines if the input from the pedal angle sensor indicates a displacement of the brake pedal that exceeds a predetermined threshold value.

5. The vehicle control system of claim 4, wherein the brake light control module detects state change criteria responsive to the input from the pedal angle sensor indicating a displacement of the brake pedal that exceeds the predetermined threshold value, and wherein the brake light control module switches control of the brake lights to being based on input from the pedal angle sensor responsive to detecting state change criteria.

6. The vehicle control system of claim 4, wherein responsive to the input from the pedal angle sensor indicating a displacement of the brake pedal that does not exceed the predetermined threshold value, the brake light control module continues to control the brake lights based on input from the pedal travel sensor.

7. The vehicle control system of claim 1, wherein the VCM detects a status signal associated with the EBB module,
wherein the VCM communicates state change criteria to the brake light control module responsive to detecting the status signal, and
wherein the brake light control module switches control of the brake lights to being based on input from the pedal angle sensor responsive to the brake light control module receiving the state change criteria.

8. The vehicle control system of claim 7, wherein the status signal is off during normal operation of the EBB system and turns on to indicate the EBB system having the fault.

9. The vehicle control system of claim 7, wherein the status signal is on during normal operation of the EBB system and turns off to indicate the EBB system having the fault.

10. The vehicle control system of claim 1, wherein the brake light control module is disposed within the vehicle control module.

11. The vehicle control system of claim 1, wherein the brake light control module is disposed between the pedal angle sensor and the vehicle control module such that the inputs to the brake light control module come from the pedal angle sensor and the EBB module.

12. The vehicle control system of claim 1, wherein the brake light control module is disposed between the vehicle control module and the brake lights such that the input to the brake light control module comes from the vehicle control module.

13. A brake light control module for controlling the operation of brake lights on a vehicle, the brake light control module being operably coupled to an electronic brake boost (EBB) system and a pedal angle sensor,
wherein the EBB system comprises an EBB module and a pedal travel sensor,
wherein the pedal angle sensor is operably coupled to a brake pedal of the vehicle to measure angular displacement of the brake pedal,
wherein the brake light control module controls operation of brake lights on the vehicle based on input from the pedal travel sensor in a first state, and
wherein the brake light control module switches to a second state in which the operation of the brake lights is controlled based on input from the pedal angle sensor responsive to the brake light control module detecting state change criteria.

14. The brake light control module of claim 13, wherein the brake light control module continually compares the input from the pedal angle sensor to the input from the pedal travel sensor.

15. The brake light control module of claim 14, wherein responsive to the input from the pedal angle sensor indicating a substantially similar displacement of the brake pedal as the input from the pedal travel sensor, the brake light control module continues to control the brake lights based on input from the pedal travel sensor.

16. The brake light control module of claim 14, wherein responsive to the input from the pedal angle sensor indicating a greater displacement of the brake pedal than the input from the pedal travel sensor, the brake light control module then determines if the input from the pedal angle sensor indicates a displacement of the brake pedal that exceeds a predetermined threshold value.

17. The brake light control module of claim 16, wherein the brake light control module detects state change criteria responsive to the input from the pedal angle sensor indicating a displacement of the brake pedal that exceeds the predetermined threshold value, and wherein the brake light control module switches control of the brake lights to being based on input from the pedal angle sensor responsive to detecting state change criteria.

18. The brake light control module of claim 16, wherein responsive to the input from the pedal angle sensor indicating a displacement of the brake pedal that does not exceed the predetermined threshold value, the brake light control module continues to control the brake lights based on input from the pedal travel sensor.

19. The brake light control module of claim 13, wherein the brake light control module switches control of the brake lights to being based on input from the pedal angle sensor responsive to a vehicle control module (VCM) communicating state change criteria to the brake light control module responsive to detecting a status signal associated with the EBB module.

20. The brake light control module of claim 19, wherein the brake light control module is disposed within the vehicle control module.

* * * * *

UNITED STATES PATENT AND TRADEMARK OFFICE
CERTIFICATE OF CORRECTION

| | | |
|---|---|---|
| PATENT NO. | : 12,115,904 B2 | Page 1 of 1 |
| APPLICATION NO. | : 18/109004 | |
| DATED | : October 15, 2024 | |
| INVENTOR(S) | : Roberto Villegas Muriel et al. | |

It is certified that error appears in the above-identified patent and that said Letters Patent is hereby corrected as shown below:

On the Title Page

In Item (73), the Assignee, "Ford Global Techologies, LLC," should read -- Ford Global Technologies, LLC --

Signed and Sealed this
First Day of April, 2025

Coke Morgan Stewart
*Acting Director of the United States Patent and Trademark Office*